United States Patent [19]

Kadan et al.

[11] Patent Number: 4,919,958
[45] Date of Patent: * Apr. 24, 1990

[54] FLAN-TYPE PUDDING

[75] Inventors: Ranjit S. Kadan, New Orleans; George M. Ziegler, Jr., Harahan, both of La.

[73] Assignee: The United States of America as represented by the Secretary of Agriculture, Washington, D.C.

[ * ] Notice: The portion of the term of this patent subsequent to Feb. 2, 2005 has been disclaimed.

[21] Appl. No.: 303,328

[22] Filed: Jan. 30, 1989

[51] Int. Cl.$^5$ .................. A23C 9/154; A23L 1/04; A23L 1/187

[52] U.S. Cl. .................. 426/573; 426/575; 426/577; 426/578; 426/579

[58] Field of Search .............. 426/573, 575, 577, 579, 426/578

[56] References Cited

U.S. PATENT DOCUMENTS

| | | | |
|---|---|---|---|
| 1,266,201 | 5/1918 | Boddington | 426/573 |
| 3,031,308 | 4/1962 | Campbell | 426/575 |
| 3,409,443 | 11/1968 | Palya et al. | 426/575 |
| 3,619,209 | 11/1971 | Hegadorn et al. | 426/575 |
| 4,479,973 | 10/1984 | Holley | 426/573 |
| 4,623,552 | 11/1986 | Rapp | 426/575 |
| 4,717,571 | 1/1988 | Okonogi et al. | 426/104 |
| 4,720,390 | 1/1988 | Bachler et al. | 426/573 |
| 4,722,851 | 2/1988 | Kadan et al. | 426/579 |

OTHER PUBLICATIONS

Heaney, Robert P., "Osteoporosis: The Need and Opportunity for Calcium Fortification", Cereal Foods World, vol. 31, No. 5, May 1986, pp. 349-352.

"Flan: The Next Yogart?", Prepared Foods, Nov. 1984, pp. 157-158.

Application Bulletin No. D-10, FMC Corp. Colloids Division, Philadelphia, Pa., 1984.

Ink, Steven L. et al., "Nurtritional Implications of Gums", Food Technology, Jan. 1987, pp. 77-82.

Descamps, O. et al., "Physical Effect of Starch/Carrageenan...", Food Technology, Apr. 1986, pp. 81-88.

Christianson, D. D. et al., "Gelatinization of Wheat Starch...", Cereal Chemistry, vol. 58, No. 6, 1981, pp. 513-517.

Jackson, Carol, "Today's Food Consumers...", Cereal Foods World, 32, pp. 417-419, 1987.

Kadan, R. S. et al., "Role of Ingredients on Texture of Flan-Like Food", Cereal Foods World, AACC 71st Ann. Meeting, Oct. 5-9, 1986, Toronto, Ontario, Canada.

New Cook Book, 1968, p. 157, Better Homes and Gardens, Meredith Press, New York, N.Y.

Primary Examiner—Jeanette Hunter
Attorney, Agent, or Firm—David R. Sadowski; M. Howard Silverstein

[57] ABSTRACT

The present invention is drawn to improvements in egg-free compositions for flan-type puddings (of the type generally described in U.S. Pat. No. 4,722,851), which provide pudding properties more closely resembling the properties of egg flan. The improved egg-free compositions of the present invention comprise: milk, sweetener, rice flour, carrageenan, tetra potassium pyrophosphate, pectin, locust bean gum and at least one material selected from the group consisting of cheese whey protein isolate and xanthane gum.

16 Claims, 2 Drawing Sheets

Sample 1: ———
Sample 2: ··········
Sample 3: ----------

Sample 1: ———
Sample 4: .......
Sample 5: - - - - -

FLAN-TYPE PUDDING

BACKGROUND OF THE INVENTION

1. Field of the Invention

The present invention is drawn to improvements in egg-free flan-type pudding of the type generally described in U.S. Pat. No. 4,722,851 (2/2/88) to Kadan and Ziegler.

2. Background Art

Custards are a popular food in many parts of the world. Recently, similar foods called flans, made from milk and certain colloids have been introduced in the U.S. market. These foods are considered to have a great potential for use as a snack, and/or meal replacement. Continuous changes in the lifestyle of affluent and working populations, particularly in developed countries, lead to novel food demands to meet their increased awareness of health, fitness and well-being. Most of the developed countries have also reached a static population growth but will continue to have increases in the proportion of middle age and elderly segments of the population. The fastest growing segment of the U.S. population is 65 and older. This group is prone to certain nutritional diseases such as obesity, osteoporosis and hypertension. Nutritionists are advocating the increased consumption of calcium rich foods to combat many of these diseases (Heaney, R. P., 1986, Osteoporosis: The Need and Opportunity for Calcium Fortification, Cer. Foods World 31:349). Dairy products are the major source of calcium in the American diet. Nonfat dry milk (NFDM) can be used as a convenient and natural source not only of calcium but also of high quality protein to engineer new foods for this group.

A custard-like dairy food has been recognized as having good potential in the U.S. food market (Flan: The Next Yogart, Prep. Foods, 1984, p. 157). Similar foods, called flans, are already popular in Europe. An old fashioned egg custard or egg flan is a moldable fresh diary product, made from a measure of milk and sugar and utilizes eggs as a gelling agent. The product is consumed as a dessert or snack food. Advances in food technology have shown that a moldable/demoldable flan can also be made by using special mixtures of carrageerans which form the gel thereby permitting production of egg-free and hence cholesterol free flan (Application Bulletin Number D-10, 1984, FMC Corp. Marine Colloids Dir. Philadelphia, Pa.). The carrageenan gel shrinks in a controlled marker as it sets up, allowing easy demolding. Only, small amounts of specially prefered and purified starches are used in the flans to avoid pastiness or 'mealy' mouth feel to the finished product. Several examples of such products are described in Appl. Bulletin No. D-10, Ibid.

SUMMARY OF THE INVENTION

While the egg-free flan-type puddings of our U.S. Pat. No. 4,722,851 (incorporated herein by reference) are highly desirable and advantageous in duplicating most of the textural response characteristics of egg-flan, said puddings do not duplicate the resiliency or resistance to chewing (which may be characterized by the time required for a textural response curve to reach a maximum height) or mouth feel (i.e. organoleptic properties) of egg-flan. It has surprisingly been found, that the egg-free flan-type puddings of the type disclosed in our U.S. Pat. No. 4,722,851 may be improved to more closely resemble the properties of egg flan (e.g. in regard to resiliency or resistance to chewing, texture (which may be characterized by texturometer or organoleptic evaluation), and increased force and time required to break the gel) by addition of cheese whey protein isolate and/or manthane gum. These improved results have been achieved with egg-free compositions comprising a mixture of: milk, sweetener, rice flour, carriageenan, tetra potassium pyrophospate, pectin, locust bean gum and at least one material selected from the group consisting of: cheese whey protein isolate and xanthane gum (i.e. either cheese whey protein isolate, or xanthane gum, or both cheese whey protein isolate and xanthane gum). The compositions of the present invention may either be in the form of: (1) a pudding, e.g. distributed to a consumer as a completely prepared pudding, or; (2) an essentially dry mixture or powder (i.e. an instant pudding mix) which a consumer may combine with liquid (e.g. water) and cook to produce a pudding.

Optionally, the flan-type puddings of the present invention may include additional additives such as: vegetable oil, animal oil, peanut oil, almond oil, hydrogenated vegetable oil or shortening, milk fat, supplemental nutrients such as minerals and vitamins, emulsifier, coloring, flavoring, fruit, etc..

In traditional egg-flan the texture is imparted by the denaturation of proteins in egg (albumin) and hence the typical and predictable texture. However, the properties of a multicomponent food, such as the flans of the present invention, are due to the complex, unpredictable, and unknown interactions of its ingredients, including: inter-molecular hydrogen bonding, electrostatic forces, Van der Waals forces, and hydrrphobic interactions. Consequently, the improved properties of the flans of the present invention are surprising, unexpected and could not have been anticipated or predicted.

DESCRIPTION OF THE PREFERRED EMBODIMENTS

Figure 1:
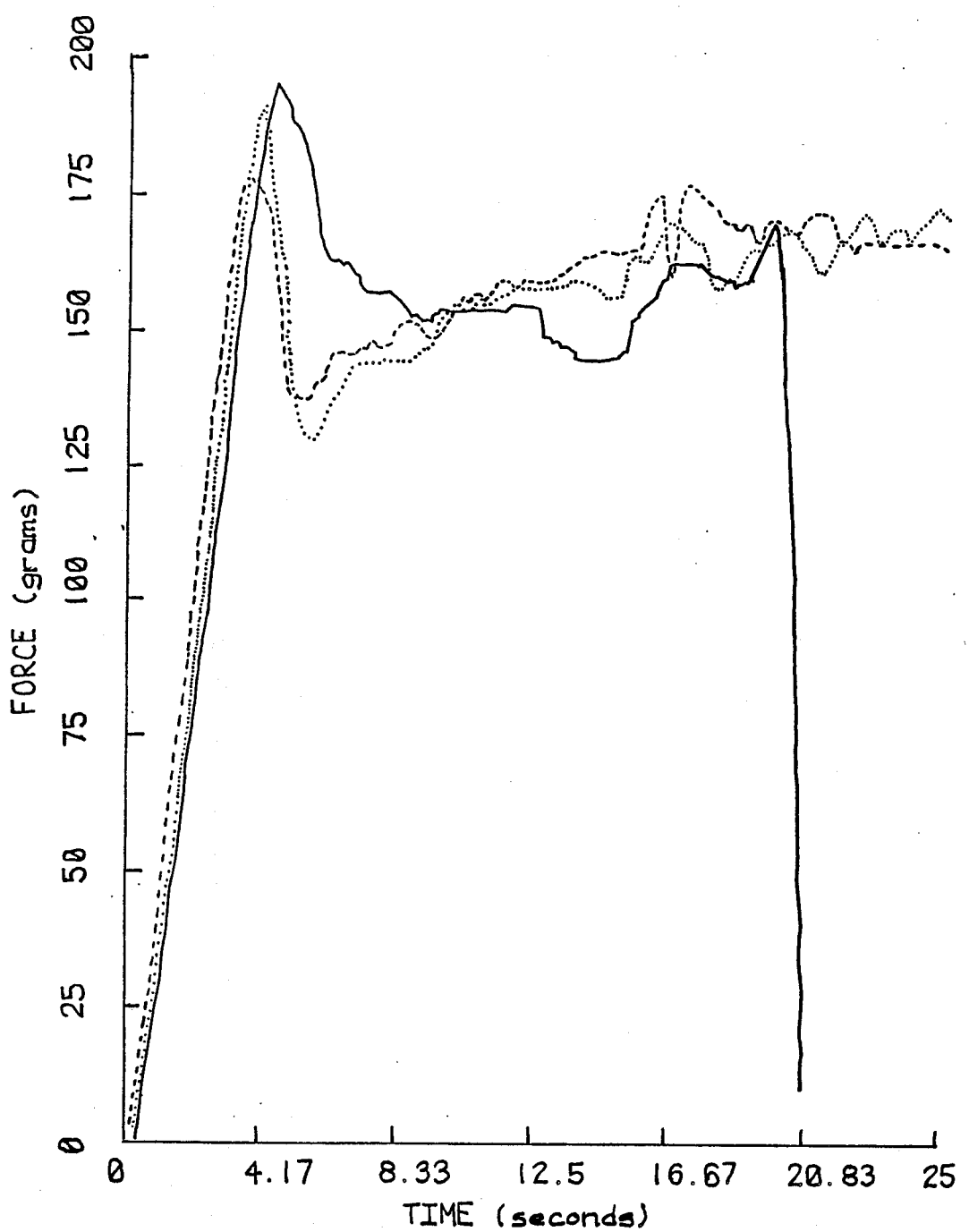
FIG. 1 is a graph of texturometer measurements of force versus time for: an egg flan (sample 1), an egg-free flan produced according to our U.S. Pat. No. 4,722,851 (sample 2) and an egg-free flan of the present invention (sample 3).

The egg-free coxpositions of the present invention may comprise a mixture of:

(a) milk, which may be whole milk or milk of lowered butter fat content such as, low-fat milk, skim milk or non-fat milk (e.g. produced from non-fat dry milk i.e. NFDM (such as low heat extragrade from Mid-America Farms, Springfield, Mo.) and water (e.g. deionized water). For those compositions of the present invention which are essentially dry, or dry or powdered, the milk may be in the form of dry or powdered milk e.g. full fat dry milk (FFDM) or non-fat dry milk (NTDM). In regard to selection of butter fat content, it should be noted that the proportion of butter fat affects the organoleptic characteristic or "mouth feel" of the pudding;

(b) sweetener, such as: sucrose, glucose, dextrose, corn syrup, fructose e.g. as in a high fructose corn syrup (such as Isosweet 5500 (containing 55% fructose, 9% dextrose, 3% complex carbohydrate and 33% water) or Isosweet 100, tooth available from the A.E. Staley Manufacturing Co., Decator, Ill.), or the caloric content of the pudding may be decreased by utilizing an artificial or nonnutritive sweetner such as aspartame, saccharin, etc.;

(c) rice flour, which may be any of the types of rice flour disclosed in our aforementioned U.S. Pat. No. 4,722,851 (e.g. untreated rice flour), and may for example include long grain rice flour available from Riviana Foods Inc., Houston, Tex.;

(d) carrageenan, which may act as a gelling agent. have been used as a gelling agent in milk for hundreds of years, initially by boiling 'Irish Moss' with milk and sugar to form gels. The extracted carrageenans have many forms, each having distinct gel characteristics. Usually various forms such as kappa, iota and lambda forms are blended to provide the desired gel characteristics. Examples of carrageenan which may be used in the present invention include; FL 674 or FL 431 available from FMC Corporation, Marine Colloids Division, Philadelphia, Pa.;

(e) tetra potassium pyrophreate, which may be to enhance bonding of pudding constituents such as milk and carrageenan, and may act as an emulsifier. Food grade tetrapotassium pyrophosphate useable in the present invention is sold by FMC Corp., Philadelphia, Pa.;

(f) pectin, which it is theorized, aids in bonding of calcium to other pudding constituents. An example of pectin which may be utilized in the present invention is Genulacta type PL93 available from Hercules, Inc., PFW Division, Wilmington, Del.; (g) locust tean gum, as described in our aforementioned U.S. Pat. No. 4,722,851. An example of a locust tean gum which may be used in the present invention is, FL 50-50 available from Hercules, Inc., PFW Division, Wilmington, Del., and;

(h) at least one material selected from the group consisting of, cheese whey protein isolate i.e. a composition typically including 35 to 75 wt. % protein, lactose and ash (an example of cheese whey protein isolate useable in the present invention is Meloskim WP-25 from Dairyland Products, Inc. Savage, Minn.), and xanthane gum e.g. that available from Miles Laboratories, Inc., Biotech Product Division, Elkhart, Ind. may be utilized in compositions of the present invention.

Carrageenan, pectin and xanthane gum, apart from imparting characteristics of gel strength to the pudding, can also contribute desirable nutritional attributes. For example, the glycosidic linkages of food gums are resistant to small intestinal digestion. Therefore, these additives can also be considered as sources of water-soluble fibers (Ink, S. L. and Hurt, D. H., 1987 Nutritional Implications of Gums, Food Tech. 41:77). The compositions of the present invention are especially advantageous for the elderly population, small infants and children, because said compositions are convenient, quick cooking, are a valuable source of much needed calcium and high quality protein, and are of controlled caloric content.

Optionally the coxpositions of the present invention may further comprise:

(a) vegetable oil, animal oil, peanut oil, almond oil, defatted peanut or almond oil, hydrogenated vegetable oil (such as CRISCO ™ shortening available from Proctor and Gamble, Co., Cincinnati, Ohio), or milk fat, any or all of which may be added in order to increase the caloric content and/or to modify the textural characteristics of the pudding;

(b) supplemental nutrients, such as and vitamins, may conveniently be added to the dry mix, especially if the pudding is intended for consumption by persons with special nutritional needs, such as infants or children;

(c) in those mixtures having added oil, shortening or milk fat, it may be advantageous to utilize a emulsifier (such as Durlac 100 from SCM, Durkee Industrial Foods, Louisville, N.Y.) to aid in homogenously combining ingredients;

(d) food coloring may readily be added to provide any desired color;

(e) flavorings, such as vanilla, butter rich, chocolate, orange, salt (NaCl), etc., may be added to provide a variety of pudding flavors; and (f) fruit, such as peaches, strawberries and pies may be added if desired.

Advantages of the flans of the present invention include, that the ingredients may all be dry blended, therefore permitting convenient preparation of an essentially dry or dry or powdered mix. In these embodiments of the present invention which include oil(s) and milk fat, homogeneous blending of ingredients may be facilitated by the process set forth in example 11 of our U.S. Pat. No. 4,722,851 i.e. combining the milk, emulsifier and oil(s) or milk fat, heating if necessary, homogenizing, and freeze drying or spray drying. Another advantage of the present invention, is that the flan may be stored in a refrigerator for extended periods without developing objectionable syneresis or significant changes in texture.

The foregoing detailed description is given merely for purposes of illustration. Modifications and variations may be made therein without departing from the spirit and scope of the invention.

EXAMPLES

The following table illustrates exemplary proportions of ingredients.

TABLE 1

| Ingredient | exemplary range of proportions of ingredients (in weight %), about: | preferred proportions (in weight %), about: | most preferred proportions (in weight %) |
| --- | --- | --- | --- |
| Water | 69 to 87 | 77.5 to 84 | 81.67 |
| Sucrose | 5 to 12 | 7 to 9.3 | 8.16 |
| NFDM | 5 to 12 | 7 to 9.3 | 7.349 |
| Rice Flour | .2 to 6 | 1 to 3 | 2 |
| Carrageenan | .1 to .6 | .23 to .35 | 0.282 |
| Tetra Potassium Pyrophosphate | .06 to .6 | .14 to .35 | .212 |
| Locust Bean Gum | 0.5 to .20 | .1 to .14 | .116 |
| Cheese Whey Protein Isolate | .01 to .6 | .04 to .1 | .073 |
| Xanthane Gum | 0.1 to .6 | .04 to .1 | .073 |
| Pectin | .02 to .6 | .04 to .1 | .065 |

Comparative Example

The following is a comparative example showing that the improved compositions of the present invention provide texture which more closely resembles the texture of egg flan than the texture of the compositions of our U.S. Pat. No. 4,722,851. The following samples were prepared:

Sample 1, Egg Flan was prepared according to the recipe in, *New Cookbook*, 1968, page 157, Better Homes and Gardens, Meredith Press, New York, N.Y., i.e. the ingredients were mixed in the proportion of: 3 slightly beaten eggs, ¼ cup sugar (sucrose) and 2 cups scalded milk; and the mixture was baked at 325° F. for 1 hour.

Sample 2; Flan of our U.S. Pat. No. 4,722,851, with the following ingredients

| | |
|---|---|
| Nonfat Dry Milk | 13.3 grams |
| Sucrose | 14.0 grams |
| Rice Flour | 3.0 grams |
| Carrageenan (FL 431) | 0.50 grams |
| Locus Bean Gum | 0.20 grams |
| Pectin | 0.112 grams |
| Tetra Potassium Pyrophosphate | 0.40 grams |
| Water | 140 grams |

Sample 3: All of the ingredients of sample 2 and 0.125 grams of WP-25 whey protein isolate obtained from Dairyland Products, Inc., Savage, Minn.;

Sample 4: All of the ingredients of sample 2 and 0.125 grams of xanthane gum obtained from IIC Gum, Inc., New York, N.Y.;

Sample 5: All of the ingredients of sample 2, 0.125 grams of WP-25 whey protein isolate, and 0.125 grams of xanthane gum.

Sample 6: The ingredients of sample 5, except that full fat dry milk was substituted for the nonfat dry milk.

The puddings of samples 2-6 were prepared by mixing all of the ingredients homogeneously and then cooking, according to the process set forth in our aforementioned U.S. Pat. No. 4,722,851.

A FMC Marine Colloids Gel Tester, Model GT-2 was modified to compare the gel strength of the samples. This was a custom designed instrument to measure the 'break force' and to develop texturometer curves of food gels. The modification involved using a Mettler PE 2000 top loading balance interfaced with a computer to record force (in grams). The forces exerted by the plunger on the experimental gel was then recorded as a function of time. A circular 'knife' (having a cylindrical die about 2 cm in diameter, fitted within a circular ring 4.5 cm in diameter, with said die and ring being attached by 4 spokes which are 0.05 cm thick and 0.5 cm high) was used as a plunger. The plunger gave reproducible curves (force vs time) during initial evaluation. The instrument was fitted with a synchroncus motor which lowered the plunger into the gel at a constant rate of 10.9 sec/cm. The rate can be adjusted depending upon the sample characteristics. After the knife contacted the gel, the top loading balance started transmitting weight signals every 0.125 seconds, thus recording force (grams) vs time (seconds) data. From the rate of descent, knife penetration (distance) into the gel can also be determined. The measurements taken with said tester, as well as results of organoleptic evaluation, are set forth in Table 2 and and FIGS. 1 and 2.

TABLE 2

| Texture and Organoleptic Characteristics of Improved Flan | | | |
|---|---|---|---|
| Sample Number | Force required to break the gel | Time in seconds needed to break the gel | Organoleptic Evaluation |
| 1 | 195 grams | 4.542 | Typical egg-flan texture |
| 2 | 191 grams | 4.088 | Egg-flan like texture. |

TABLE 2-continued

| Texture and Organoleptic Characteristics of Improved Flan | | | |
|---|---|---|---|
| Sample Number | Force required to break the gel | Time in seconds needed to break the gel | Organoleptic Evaluation |
| | | | but lacking some aspects of typical chewiness of egg flan. |
| 3 | 178 grams | 3.785 | Improved chewiness as compared with above. |
| 4 | 191 grams | 5.148 | Very chewy but rubbery brittle texture. |
| 5 | 208 grams | 4.845 | Typical egg-flan texture. |
| 6 | 179 grams | 4.454 | Typical egg-flan testure. with smooth chewiness. |

Figure 2:
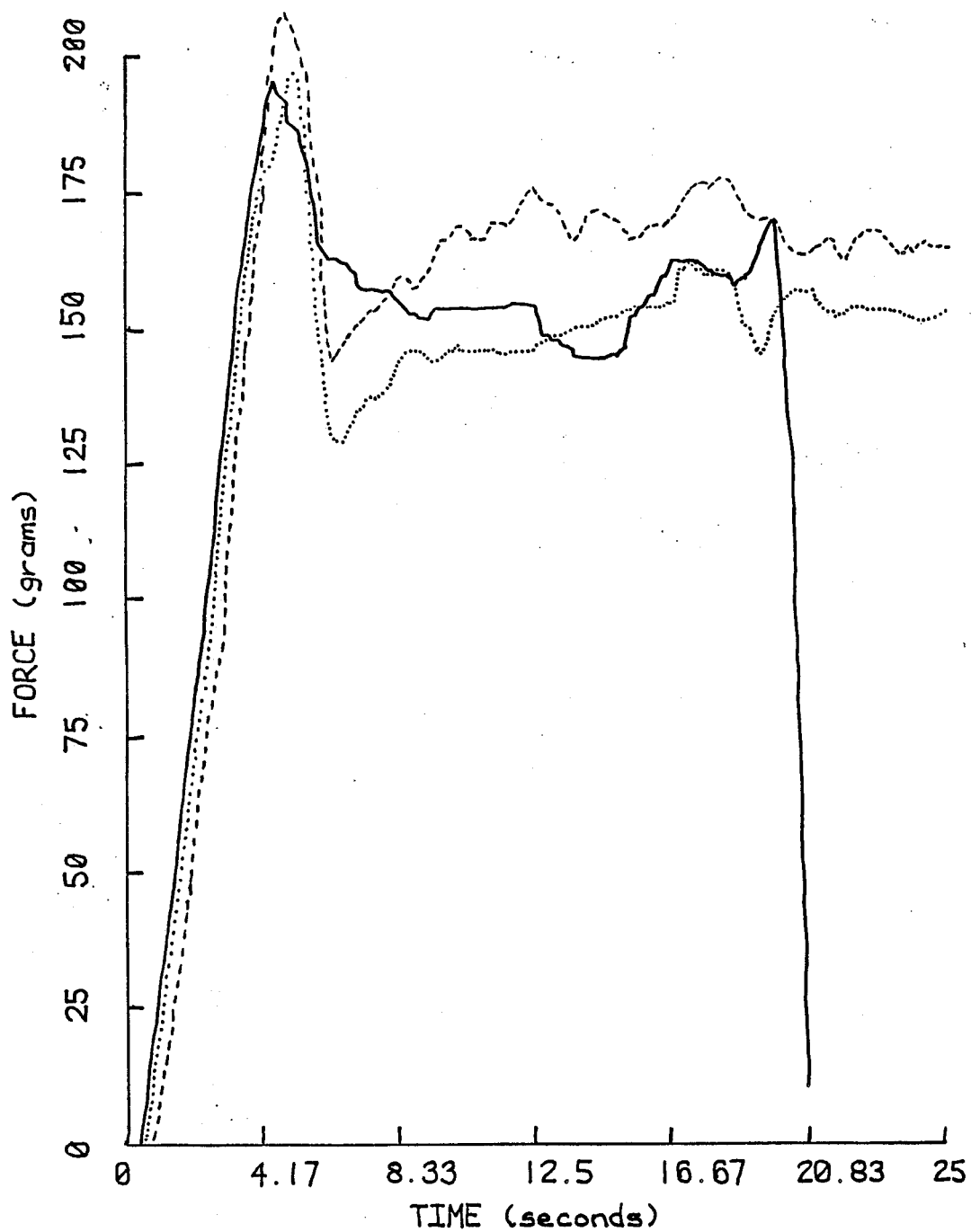
FIG. 2 is a graph of texturometer measurements of force versus time for: an egg flan (sample 1), and two egg-free flans of the present invention (samples 4 and 5).

As illustrated in table 1 in regard to samples 3-6, the compositions of the present invention provide the advantages of: (1) improved chewiness, (the use of both whey protein isolate and xanthane gum providing texture typical of egg-flan); (2) use of xanthane gum, and xanthane gum with whey protein isolate (samples 4 and 5) providing, higher force required to break the gel and longer time needed to break the gel. FIGS. 1 and 2 show that the compositions of the present invention (i.e. samples 3-5) provide force vs. time curves which closely resemble the curve for egg flan (sample 1). It is especially noteworthy that FIG. 2 shows, that for samples 4 and 5 the initial peak is higher and occurs after the initial peak for egg flan (sample I), thus indicating a highly desirable resilence and chewiness (i.e. a relatively high force, and a relatively long period, required to break the gel).

The foregoing examples are intended only to illustrate the invention, and are not intended to limit the scope of the invention which is defined by the claims.

We claim:

1. An egg-free composition comprising a mixture of: milk, sweetener, rice flour, carrageenan, tetra potassium pyrophosphate, pectin, locust bean gum, and at least one material selected from the group consisting of cheese whey protein isolate and xanthane gum 2. The composition of claim 1 including cheese whey protein isolate.

3. The composition of claim 1 including xanthane gum.

4. The composition of claim 1 including both cheese whey protein isolate and xanthan gum.

5. The composition of claim 4 consisting of: about 69 to 87 weight % water, about 5 to 12 weight % sucrose, about 5 to 12 weight % non-fat dry milk, about 0.2 to 6 weight % rice flour, about 0.1 to 0.6 weight % carrageenan, about 0.06 to 0.6 weight % tetra potassium pyrophosphate about 0.05 to 0.20 weight % locust bean gum, about 0.01 to 0.6 weight % cheese whey protein isolate, about 0.10 to 0.6 weight % xanthane gum, and about 0.02 to 0.6 weight % pectin.

6. The composition of claim 5 consisting of: about 77.5 to 84 weight % water, about 7 to 9.3 weight % sucrose, about 7 to 9.3 weight non-fat dry milk, about 1 to 3 weight % rice flour, about 0.23 to 0.35 weight % carrageenan, about 0.14 to 0.35 weight % tetra potassium pyrophosphate, about 0.1 to 0.14 weight % locust bean gum, about 0.04 to 0.1 weight % cheese whey protein isolate, about 0.04 to 0.1 weight % xanthane gum, and about 0.04 to 0.1 weight % pectin.

7. The composition of claim 1 further including one or more oils selected from the group consisting of: vegetable oil, animal oil, peanut oil, almond oil and hydrogenated vegetable oil.

8. The composition of claim 7 further including an emulsifier.

9. The composition of claim 1 further including added milk fat.

10. The composition of claim 9 further including an emulsifier.

11. The composition of claim 1 wherein said milk is selected from the group consisting of: whole milk, low-fat milk and non-fat milk.

12. The composition of claim 11 wherein said milk is dry or powdered milk.

13. The composition of claim 1 wherein said sucrose is one or more sweetener selected from the group consisting of: sucrose, glucose, dextrose, corn syrup, fructose, high fructose corn syrup, aspartame and saccharin.

14. The composition of claim 1 in the form of a pudding.

15. The composition of claim 1 wherein said milk is dry or powdered milk.

16. The composition of claim 15 in the form of an essentially dry mixture.

* * * * *